United States Patent [19]

Wilson

[11] 3,940,276

[45] Feb. 24, 1976

[54] SPINEL AND ALUMINUM-BASE METAL CERMET

[75] Inventor: Lois E. Wilson, Painted Post, N.Y.

[73] Assignee: Corning Glass Works, Corning, N.Y.

[22] Filed: Nov. 1, 1973

[21] Appl. No.: 411,947

[52] U.S. Cl. ............... 106/62; 106/65; 106/73.4; 51/309 A
[51] Int. Cl.² C04B 35/04; C04B 35/10; C04B 35/70
[58] Field of Search .......... 106/62, 65, 73.4; 51/309

[56] References Cited
UNITED STATES PATENTS
3,437,468    4/1969    Seufert.................................. 106/62

*Primary Examiner*—J. Poer
*Attorney, Agent, or Firm*—Richard N. Wardell; Clarence R. Patty, Jr.

[57] ABSTRACT

Dense coherent composition of matter composed essentially of, on a weight basis, 10 to 30% aluminum-base metal phase finely interspersed throughout a mass of substantially submicron size crystals of at least 60% magnesium aluminate spinel, 0 to 10% alpha alumina, 0 to 2% mullite and 0 to 5% magnesium aluminum boride. Made by bringing molten aluminum-base metal at 650°–850°C. into contact with a mass of melted and solidified material consisting essentially of, analytically by weight, at least 65% being a base composition and 0 to 35% $B_2O_3$, the base composition consisting of 5 to less than 40% MgO, 5 to 43% $Al_2O_3$ and 35 to 85% $SiO_2$. Upon contact, metal reacts with mass to transform a substantial portion of the mass into the cermet composition of matter. May be used in form of abrasive grain and/or abrasive articles.

13 Claims, No Drawings

SPINEL AND ALUMINUM-BASE METAL CERMET

BACKGROUND OF THE INVENTION

Cermets are that class of materials being a heterogeneous mixture of ceramic and metal phases or particles finely interspersed or intimately intermixed with each other. Cf. U.S. Pat. No. 3,421,863, column 1, lines 29–35, and Ceramic Glossary published 1963 by The American Ceramic Society, page 9. More commonly, cermets are formed by physically combining separately pre-existing ceramic and metal materials. However, as earlier disclosed in U.S. Pat. No. 2,702,750, some cermets may be produced with in situ formation of a metal phase in a solid mass of silica-containing ceramic material by contacting that solid mass with molten metal (e.g. aluminum or alloys thereof) at about 700° to 900°C. such that the contacted mass remains substantially solid and retains its shape and size. Upon such contact, the molten metal reacts with the solid mass by reducing the silica therein to silicon and replacing it with simultaneously formed crystalline oxide of the contacting metal (e.g. alumina) and with some of the contacting metal itself, both oxide and metal being thoroughly and intimately interspersed in the transformed crystalline solid mass. The resultant silicon is mainly found dissolved in the excess contacting metal which is external to the transformed solid mass. This latter type of cermet is sometimes designated as a "reaction cermet". The suggested uses of such cermets include electrical conductors and/or resistance elements, refractory articles and abrasive articles. For the latter articles, it is proposed to transform silica sand into cermet abrasive grains of alumina and aluminum-base metal, which may be ceramically bonded to form grinding wheels (similar to those of the common fused or sintered alumina abrasive grains). Alternatively, it is proposed to transform a fused silica disk into a cermet grinding wheel of alumina and aluminum-base metal.

While acknowledging reaction cermets to be "characterized by a highly refractory nature, a high degree of hardness, good electrical conductivity and variable abrasive characteristics," U.S. Pat. No. 3,034,908 discloses employing an alloy of aluminum with 20–35 wt.% silicon at 900° to 950°C. in the process of making a reaction cermet body from a silicate glass body so that, unlike the products of earlier processes, such cermet body will have a more homogeneous composition and structure with no apparent defects (such as voids or cracks).

A variant reaction cermet is described in U.S. Pat. No. 3,295,934 as having a matrix which is rich in aluminum and in which there is a dispersed phase of granular glass particles with a surface layer of alumina resulting from limited reaction of the glass and aluminum during heating of a pressed preform at about 600° to 800°C. for 5 to 40 minutes. The preform is made from a mixture of 25–50 wt.% moderately reactive glass particles and 75–50 wt.% aluminum-rich metal particles. A moderately reactive glass may contain 45–57 wt.% $SiO_2$, 15–28 wt.% $MgO$, and 20–30 wt.% $Al_2O_3$ wherein $SiO_2$ + $MgO$ + $Al_2O_3$ is at least 80 wt.%. This type of cermet is said to have great hardness and high resistance to shearing and crushing. It is recommended for cylinder heads and pistons of internal combustion engines and other items subjected to temperatures up to 400°C. However, tests made on this type of cermet showed that, in addition to the large amount of metal phase therein, it had average crystal sizes on the order of twenty to forty microns and abrasive grit size particles exhibited high attritious wear rate, e.g. about $30 \times 10^{-6}$ inch/cut.

More recently, it was proposed in U.S. Pat. No. 3,437,468 to make abrasive grain of reaction cermet type of composite material by covering a molten pool of aluminum at a temperature of at least 1000°C. with a layer of finely divided magnesium silicate. After reaction with the molten aluminum, the transformed silicate is a composite material composed of (by weight) 35 to 55% magnesium aluminate spinel, 15 to 35% alpha alumina and 20 to 40% of an elemental phase comprising free silicon and/or a silicon-aluminum intermetallic with optional presence of free aluminum. The prominence of silicon in the elemental or metal phase in such reaction cermet is apparently due, at least in part, to the higher reaction temperature vis a vis the earlier reaction cermets described above.

Despite the foregoing developments, reaction cermets have not found, to my knowledge, any apparent commercial and industrial favor or usage as abrasive grain.

A continuing major focus in the abrasives industry today is the development of more efficient abrasive grain having longer lifespan for heavy duty snag grinding (also called "snagging") of ingots and castings of metal (e.g. steels).

As known to me, the presently best abrasive grains (i.e. particulate abrasive material) that are commercially available and employed for heavy duty snag grinding consist of a fused mixture of alumina and zirconia, both of high purity quality. The two most common compositions of these commercial abrasives appear to have approximate $Al_2O_3$:$ZrO_2$ weight ratios of 3:2 and 3:1. The development of these fused alumina-zirconia grains substantially overcame such deficiencies in prior abrasive grains as the relatively high rates of chipping due to brittleness of widely used fused grains and the relatively high rates of attritious wear due to abrasive softness of zirconia grains and sintered alumina grains. Both deficiencies contribute to low efficiency, which is usually the ratio of metal removal to grinding wheel wear. However, there still remains a strong desire of users of the abrasive grains for even further improvments that will afford them significant economic advantage.

SUMMARY OF THE INVENTION

I have now discovered a new reaction cermet that is composed overwhelmingly or wholly of magnesium aluminate spinel crystals and a method of making it. I have also found that this new cermet, especially with a fine-grained crystal structure, can be crushed or formed into abrasive grain that has substantially lesser tendency for chipping (viz. lesser probability of fracture) and substantially lesser rates of attritious wear than the commercial fused alumina-zirconia abrasives. The new cermet also has other beneficial characteristics that make it useful other than as abrasive grain.

Broadly stated, the cermet composition of matter of my invention is a dense, coherent, substantially homogeneous material composed essentially of, on a weight basis, at least 60% magnesium aluminate spinel crystals, 0 to 10% alpha alumina crystals, 0 to 2% mullite crystals, 0 to 5% magnesium aluminum boride crystals and 10 to 30% aluminum-base metal phase. In especially advantageous form, this cermet is a fine-grained material wherein at least 90% by volume of the crystals of spinel, alumina and mullite are of a size less than 1 micron. The average size of such submicron size crystals is desirably not more than 0.5 micron. The metal phase is finely interspersed throughout the mass of crystals of spinel, alumina and mullite. The amounts of alpha alumina and mullite crystals are severely restricted in order to avoid undesirable abrasive chipping and wear characteristics. The substantial strength and toughness of the new cermet appear to be mainly provided by the substantially homogeneous composite of predominately fine-grained spinel crystals throroughly and finely interspersed with the aluminum-base metal phase.

The tendency to lesser abrasive chipping and wear is further enhanced by the presence of boron in the composition, which sometimes forms observable discrete crystals of boride scattered in an irregular random manner throughout the cermet (commonly in apparently pre-existing small void spaces within or on the surface of the cermet mass). Such boride appears to be $MgAlB_{14}$ and in the form of platelets of submicron thickness, but with their longest dimension not infrequently exeeding 1 micron. However, the new cermet often does not appear to contain any or enough boride crystals (even under electron microscopy examination) to account for all of the boron detectable in the cermet by chemical analysis; nevertheless, all such detectable boron appears to provide the noted enhancement of abrasive characteristics in this reaction cermet.

On an analytical basis, the new cermet broadly comprises (by weight) 2.5 to 33% MgO, 39 to 76% $Al_2O_3$, 0 to 22% $B_2O_3$ and the balance being essentially aluminum-base metal, the latter forming a metal phase that does not exceed 26% by weight of the cermet. Most preferably, the cermet is composed wholly of (by weight) at least 75% magnesium aluminate spinel crystals, 0 to 2% magnesium aluminum boride crystals and 10 to 26% aluminum-base metal phase. For best abrasive characteristics, the analytical boron content (expressed as $B_2O_3$) is 3 to 10% by weight of the cermet.

Although magnesium aluminate spinel is often denoted as the stoichiometric compound $MgO.Al_2O_3$, it is well known that magnesium aluminate spinel crystals may contain a substantial $Al_2O_3$ content in excess of the stoichiometric amount dissolved therein as a solid solution in the spinel crystal lattice. As used throughout herein, magnesium aluminate spinel means and includes such spinel with and without excess solid solutioned $Al_2O_3$ up to the maximum amount possible.

The term aluminum-base metal, as used throughout herein, is synonymous with aluminum-rich metal and means metal or alloy containing more than 50% by weight of aluminum, which includes pure aluminum. Preferably, the molten contacting metal is a commercially pure grade of aluminum, which provides an aluminum-base metal phase in the cermet of substantially 98+% Al by weight. However, commercially available and other aluminum alloys with at least about 75% by weight aluminum may preferably be employed as desired. Examples of such alloys are:

5–15 wt.% Zn, balance Al and incidental impurities.
5–10 wt.% Mg. balance Al and incidental impurities.
5–20 wt.% Si, balance Al and incidental impurities.
5–10 wt.% Fe, balance Al and incidental impurities.
5–10 wt.% Mn, balance Al and incidental impurities.

My invention also encompasses a method of making the new cermet. The method broadly comprises providing a mass of melted and solidified material consisting essentially of, analytically by weight, at least 65% being a base composition and 0 to 35% $B_2O_3$, the base composition consisting of 5 to less than 40% MgO, 5 to 43% $Al_2O_3$ and 35 to 85% $SiO_2$, contacting the mass with molten aluminum-base metal maintained at temperature in the range of about 650° to 850°C. when the MgO content of the base composition is at least 8% and in the range of about 650° to 750°C. when the MgO content of the base composition is less than 8%, maintaining the mass in contact with the molten metal for a time sufficient to effect reaction between the mass and the molten metal and to transform a substantial portion of the mass into the cermet composition. Provision of the reactant mass in a melted and solidified state insures the development of the dense, coherent and substantial homogeneous character of my new cermet of mainly spinel and aluminum-base metal. In most cases, such mass is a glass, but in some instances it may solidify as a partially or wholly crystallized (or devitrified) material. The reactant mass, upon solidification, may be formed into bodies of a particular desired shape and size, which shape and size is retained during processing of those bodies to transform them to the cermet composition. When such preformed bodies are to be abrasive grain or particles, it is advantageous to employ the forming method as described in the copending application of W. S. Blanding and J. A. Brothers, Ser. No. 253,186, filed May 15, 1972, which is U.S. Pat. No. 3,859,407.

When the MgO content of the base composition is less than 8%, I have found that reaction temperature (i.e. temperature of the contacting molten metal) of greater than 750°C. will adversely produce an excessive amount of alpha alumina crystals at the expense of a lesser amount of spinel crystals. Accordingly, in that situation, the reaction temperature must not exceed 750°C. to obtain the new cermet.

The minimum MgO content of the base composition, besides being necessary for adequate spinel crystal formation, is important for obtaining a mass that is meltable at reasonable temperature, e.g. usually 1650°C. maximum. Similarly important for such melting characteristics are the maximum contents of $Al_2O_3$, MgO and $SiO_2$ of the base composition. Additionally, the maximum MgO content is important for avoiding masses that are not reactable with the molten aluminum-base metal.

Preferably, the mass of melted and solidified material consists essentially of, analytically by weight, at least 80% being the base composition and 0 to 20% $B_2O_3$, with the base composition consisting of 8 to 30% MgO, 15 to 40% $Al_2O_3$ and 45 to 70% $SiO_2$. For the production of abrasive grain with outstanding performance characteristics, the analytical $B_2O_3$ content of the reactant mass advantageously should be about 4 to 14%.

My invention includes abrasive articles comprising a coacting combination of the above-described cermet abrasive grain and bonding material. The bonding material to be employed is that material selected from among the many materials which are known or will be recognized as suitable for making any given type of article. In other words, there is no particular critical bonding material for my abrasive grain of the present invention. Suitable bonding materials can range from organic to inorganic bonding agents as the circumstances dictate according to principles known in this art. While bonds like Sorel cement (magnesium oxychloride), sodium silicate cement or metallic bonds may be used in making certain articles of my abrasive grain, the more common organic polymer or vitrified silicate bonding agents (such as those used with alumina or alumina-zirconia abrasive grain) are preferred, especially for heavy-duty grinding wheels. The organic polymer bond is ordinarily preferable over even the best alkali metal-containing vitrified silicate bonds. Among the many suitable organic polymer bonds are phenolic resins (phenol aldehydes with or without modifying additions of epoxy or vinyl resins), creosol aldehyde resins, resorcinol aldehyde resins, urea aldehyde resins, melamine aldehyde resins, aniline aldehyde resins, epoxy resins, alkyd resins, polyurethane resins, polyester resins, polyether resins, furfuryl alcohol resins, vulcanized natural rubber, butadiene-acrylonitrile copolymers, butadiene-styrene copolymers, shellac, varnish and the like. The most common suitable type is the phenol formaldehyde resin.

The organic bonding material usually includes additives, as is well known in the art, of fillers, modifiers, crosslinking agents and the like. Common fillers are metal sulfides, cryolite, potassium fluoroborate, potassium sulfate, soda ash, table salt, carbon black and the like. Lime is also commonly added.

In making bonded abrasive articles or grinding wheels, about 40 to 64% by volume of them is abrasive grain, about 10 to 60% by volume is the total bonding material (including additives) and the balance is porosity. Fillers are usually about 8–30% by volume of the total bonding material and lime is usually 1–8% by volume of the same. Initially, the abrasive grain is ordinarily wet with a solvent, wetting agent and/or liquid resin. Then it is mixed with the bonding materials and the mixture is pressed (usually also heated) to shape. In the case of the more common thermosetting bonds, the article is cured by heating to harden or set the resin bond.

Coated abrasive articles can also be advantageously made with the new cermet abrasive grain. Conventional flexible backing of paper or cloth sized with common adhesives (e.g. hide glue mixed with calcium carbonate and water) is coated on one side with the abrasive grain applied to a wet adhesive making coat which is thereafter dried. A final sizing coat is usually applied on top of the adhesive making coat as is known in the art.

DESCRIPTION OF THE PREFERRED EMBODIMENTS

Example 1.

Samples were prepared by first melting at 1650°C. an appropraite ball milled mixture of raw materials to yield glasses with calculated analyses (from raw materials) as set forth in Table I. Typical analyses of the raw materials employed were (by weight):

Silica sand (−200 mesh: 99.8% $SiO_2$, 0.01% $Na_2O$, 0.02% $K_2O$, 0.01% $TiO_2$, 0.02% $Fe_2O_3$, 0.01% $Al_2O_3$;

Alumina (95% −60 mesh): 99.7% $Al_2O_3$, 0.04% $Fe_2O_3$, 0.03% $Na_2O$;

Magnesia (90% −200 mesh): 97.2% $MgO$, 1.0% $CaO$, 0.4% $SiO_2$, 0.25% $Fe_2O_3$, 0.15% $Al_2O_3$, 0.001% $Cr_2O_3$;

Boric oxide (70% −60+200 mesh anhydrous): 99.8% $B_2O_3$.

TABLE I

Chemical Analyses of Glasses (calc.) - % by weight

| Sample | Base Composition | | | | $B_2O_3$ |
|---|---|---|---|---|---|
| | $SiO_2$* | $Al_2O_3$* | $MgO$* | Total | |
| A | 66.0 | 21.0 | 13.0 | 100.00 | 0 |
| B | do. | do. | do. | 95.24 | 4.76 |
| C | do. | do. | do. | 90.91 | 9.09 |
| D | do. | do. | do. | 86.96 | 13.04 |
| E | do. | do. | do. | 83.33 | 16.67 |
| F | 48.0 | 32.6 | 19.4 | 100.00 | 0 |
| G | do. | do. | do. | 95.24 | 4.76 |
| H | do. | do. | do. | 90.91 | 9.09 |
| I | do. | do. | do. | 86.96 | 13.04 |
| J | do. | do. | do. | 83.33 | 16.67 |
| K | do. | do. | do. | 86.92 | 23.08 |
| L | 56.0 | 31.0 | 13.0 | 100.00 | 0 |
| M | do. | do. | do. | 95.24 | 4.76 |
| N | do. | do. | do. | 90.91 | 9.09 |
| O | do. | do. | do. | 86.96 | 13.04 |
| P | do. | do. | do. | 83.33 | 16.67 |
| Q | do. | do. | do. | 80.00 | 20.00 |
| R | do. | do. | do. | 86.92 | 23.08 |

*As a percent of the base composition only.

The following typical actual analysis (by weight) of Sample H glass illustrates (by comparison with the calculated analysis thereof in Table I) the fact that the calculated analyses correspond substantially close to actual analyses: 43.45% $SiO_2$, 30.17% $Al_2O_3$, 17.2% $B_2O_3$, 9.14% $B_2O_3$.

Each of the melted glasses was poured at a temperature of about 1300° to 1500°C. (usually about 1350° to 1400°C) between a pair of cooperating water cooled steel forming rolls in accordance with the method described in the aforementioned copending application. Each of the rolls was provided with an engraved or recessed patterened surface in the form of one half of an octahedral impression, and the rolls were synchronized so that the patterns on opposing rolls were matched when in contact with the molten glass at the bite thereof. The rolls were spaced about 0.015 inch apart and rotated at a speed to form about 20 to 40 feet of glass ribbon per minute. The formed glass ribbon issued from the rolls contained four rows of small, substantially octahedral shape portions joined together along adjacent edges by thin, narrow webs of glass generally within a central plane of the ribbon. Each half of each octahedral portion protruded out from a broad surface (or central plane) of the ribbon opposite to that from which the other half thereof protruded. Each protruding half terminated in a formed apex and the 0.120 inch axis extending between those opposed formed apexes was perpendicular to and bisected by the central plane of the ribbon.

Upon cooling, the formed glass ribbon was cut into segments of convenient length for immersing in a bath of molten aluminum. Prior to immersion, these segments were preheated up to the temperature of the molten aluminum over a period of about 10 minutes to insure against thermal shock fracture on immersion. The temperature of the molten aluminum upon and during immersion was 700°C., and the time of immersion was as set forth in Table 4. The aluminum employed had a purity of 99.99% by weight. During immersion, the glass segments reacted with the aluminum and were thoroughly transformed to reaction cermets whose chemical and phase analyses were as set forth in Tables 2 3, respectively. The calculated chemical analyses of the cermets were determined as follows:

1. the weight percent of each oxide in the glass composition is converted to the corresponding molar quantity thereof;

2. the molar amount of $Al_2O_3$ and Si formed during reaction is determined from molar amount of $SiO_2$ in the glass composition according to the reaction formula:

$$3SiO_2 + 4Al \rightarrow 2Al_2O_3 + 3Si;$$

3. the molar amount of $Al_2O_3$ in the glass composition is added to the molar amount of $Al_2O_3$ calculated in step (2) above to obtain total molar amount of $Al_2O_3$ in cermet;

4. the calculated molar amounts of $Al_2O_3$ (total) from step (3), Si from step (2), and MgO and $B_2O_3$ from step (1) are converted to corresponding parts by weight;

5. since it has been generally found that almost all of the formed Si diffuses out into the molten Al bath and is replaced in the cermet by an approximately equivalent volume of Al from the bath, determination is made of the parts by weight of Al (in the cermet) which are the volumetric equivalent of the parts by weight of Si from step (4); and (6) the calculated parts by weight of $Al_2O_3$, MgO, $B_2O_3$ and Al from steps (4) and (5) are converted to corresponding weight percents of the cermet composition. It is to be noted that, in some cases where actual chemical analysis showed a small Si content in the cermet, that amount of Si is not considered as replaced by Al in the aforementioned step (5), but is considered (as weight percent of Si in the cermet) when making the calculations of step (6). The actual chemical analysis values for each cermet do not add up to 100% because of inherent experimental error occurring in the separate analysis procedure for each constituent.

Upon removal from the molten aluminum bath (then containing dissolved silicon derived from the glass), the cermet segments had an adhering coating of aluminum-base metal. That coating was removed by immersing those segments in an aqueous solution of 25% sodium hydroxide at 70°–90°C. for about 60–90 minutes (which was just sufficient to merely leach off that coating, but not sufficient to leach any significant amount of aluminum-base metal phase out of the cermet segments) and immediately thereafter those segments were vigorously washed with water to remove all residue of the caustic solution.

TABLE 2

| Sample | Chemical Analyses of Cermets - % by weight | | | | |
|--------|-------|-------|-------|-------|-------|
|        | $Al_2O_3$ | MgO | $B_2O_3$ | Al | Si |
| A | 66.24 | 9.00 | — | 24.76 | — |
| B | 64.00 | 8.71 | 3.35 | 23.7 | 0.24 |
|   | 67.22* | 8.71* | 2.63* | 20.0* | 0.24* |
| C | 61.96 | 8.42 | 6.47 | 23.15 | — |
| D | 60.01 | 8.15 | 9.41 | 22.18 | 0.25 |
|   | 65.5* | 7.87* | 7.69* | 20.2* | 0.25* |
| E | 58.18 | 7.90 | 12.17 | 21.75 | — |
| F | 65.68 | 14.66 | — | 19.66 | — |
| G | 63.29 | 14.13 | 3.64 | 18.72 | 0.22 |
|   | 73.0* | 14.1* | 3.30* | 12.8* | 0.22* |
| H | 61.07 | 13.63 | 7.03 | 18.05 | 0.22 |
|   | 74.0* | 13.2* | 5.96* | 12.1* | 0.22* |
| I | 58.99 | 13.17 | 10.18 | 17.66 | — |
| J | 57.06 | 12.74 | 13.13 | 17.07 | — |
| K | 53.54 | 11.95 | 18.49 | 16.02 | — |
| L | 68.52 | 9.44 | — | 22.04 | — |
| M | 66.12 | 9.12 | 3.50 | 21.06 | 0.20 |
|   | 76.14* | 9.28* | 2.70* | 14.8* | 0.20* |
| N | 63.89 | 8.80 | 6.77 | 20.54 | — |
| O | 61.80 | 8.51 | 9.82 | 19.87 | — |
| P | 59.84 | 8.24 | 12.68 | 19.24 | — |
| Q | 57.93 | 7.98 | 15.35 | 18.64 | — |

TABLE 2-continued

| Sample | Chemical Analyses of Cermets - % by weight | | | | |
|--------|-------|-------|-------|-------|-------|
|        | $Al_2O_3$ | MgO | $B_2O_3$ | Al | Si |
| R | 56.27 | 7.75 | 17.89 | 18.09 | — |

*Actual analysis; all others are calculated analyses.

TABLE 3

| Sample | Phase Analyses of Cermets - % by weight | |
|--------|-------|-------|
|        | Metal | Mg-Al Spinel |
| A | 24.76 | Balance (1) |
| B | 23.94 | do. |
| C | 23.15 | do. |
| D | 22.43 | do. |
|   | 13.2–15.2* | do. |
| E | 21.75 | do. |
| F | 19.66 | do. |
| G | 18.94 | do. |
|   | 11.8–12.6* | do. |
| H | 18.27 | do. |
| I | 17.66 | do. |
| J | 17.07 | do. |
| K | 16.02 | do. |
| L | 22.04 | do. |
| M | 21.26 | do. |
|   | 11.9–13.1* | do. |
| N | 20.54 | do. |
| O | 19.87 | do. |
| P | 19.24 | do. |
| Q | 18.64 | do. |
| R | 18.09 | do. |

*Actual by X-ray diffraction; all others are calculated analyses.
(1) All samples estimated to contain (by weight) not more than 10% alpha alumina, 2% mullite and 5% $MgAlB_{14}$ (based upon x-ray diffraction and microscopic examinations).

By flexing the washed segments, they were broken along the connecting webs to liberate the generally octahedral portions thereof as loose octahedral abrasive grains. By evaluation with U.S. Standard Sieves, those grains were found to be at least 95% −8+10 mesh and to conform to the abrasive grit size No. 10 standards of the American National Standards Institute (formerly United States of America Standards Institute) as set forth in the USAS standards bulletin B74.12-1968, Table 2.

As an illustration of the density of these cermet grains, the measured pycnometric density of Sample H (immersed 24 hours) was 3.206 gm./cc. in comparison with its calculated theoretical density of 3.286 gm./cc.

Similarly illustrative of the average crystal size of these cermet grains, such size of Sample H (immersed 24 hours) was about 0.2 micron.

Ten specimens of the grains of each sample described above were subjected to a plain fly milling test of a type now employed in the abrasives industry to evaluate abrasive grains. In that test, a grain specimen is mounted in a holder, by means of epoxy resin cement, on the periphery of a 16 inch diameter fly wheel driven by a motor and having a horizontal axis of rotation. The grain specimen is mounted so as to have one of its points or apexes protruding radially outward from the wheel periphery. In the case of the cermet grains, the protruding apex was one formed in the recessed pattern of one of the glass ribbon forming rolls. The radial distance between the wheel periphery and the cutting tip or point of the protruding apex of the grain specimen is measured so as to determine the diameter of the circular path travelled by such tip or point. A steel test plate (6 × 3 × ¾ inch) is fastened to a movable support which enables this plate to be fed or moved laterally underneath the fly-wheel. The plate is mounted in an inclined position of a rise of 0.00436 inch in 6 inches of plate length. The plate is fed toward the wheel in the axial direction of the wheel and with the lower (or forward) end of the plate passing under the wheel first. The initial vertical position of the plate vis a vis the wheel is established by turning the wheel so that the grain specimen is at the lowermost position, moving the forward end of the plate under the grain specimen to a position where, as the wheel is lowered, the cutting point of the grain specimen will scratch the plate surface at about 0.35 inch from its forward end. While slowly lowering the wheel, the wheel is oscillated by hand until it is felt that the grain tip has just slightly scratched the plate surface and the resultant fine scratch is just visible to the eye of the operator. With the grain positioned out of contact with the plate, the latter is moved laterally until its forward end is just beyond the point of being underneath the path travelled by the grain cutting tip. Next, the motor-driven wheel is rotated at a peripheral speed of 12,500 sfpm. Then the plate is fed or passed laterally toward the wheel at a speed such that the rotating grain tip (in the absence any chipping) will make a series or row of 110 successive and progressively deeper cuts in the top surface of the plate with these spaced 0.0545 inch apart along the 6 inch length of the plate. In the same manner, four additional series of cuts are made on the same plate with the same grain specimen as in the first series of cuts. In all five series of cuts, measurements are made of the length of a cut and its distance from the forward end of the plate with respect to each of the first and last cuts of each series and the cuts immediately before and after the cut or cuts during which chipping occurred (as is observable on the plate). In one selected series, additional measurements of the same type are made with respect to each of five cuts located nearest to a whole number of inch or inches from the forward end of the plate along the length of such series.

With the aid of a programmed computer, the depth of the cuts and the probability of fracture and attritious wear rate for each sample are calculated from the above-described measurements. Since measurement of the length of a cut is more convenient than measurement of the depth of a cut, the programmed computer is utilized to calculate depth of a cut in accordance with the known relationship:

$$l = 2\sqrt{Dt}$$

where l is the length of the cut, $D$ is the diameter of the circular path travelled by the grain cutting tip and $t$ is the depth of the cut.

Probability of fracture indicates the relative impact resistance or resistance to chipping of abrasive grain under nominal grinding conditions. In computing probability of fracture, the computer first determines for each fracture cut (i.e. cut during which fracture occurred) found in the five series of cuts the depth of that cut in the absence of the fracture. This is done by adding 0.00436/110 inch to the calculated depth of the cut immediately preceding the fracture cut. The total number of these fracture cuts with calculated depths in the range of 2.616 to 3.924 × $10^{-3}$ inch is determined for all five series on all 10 plates cut by the ten specimens and stored for a subsequent computation. Next, determination is made of the rate of cut depth increase per cut (which is less than the ideal rate based on the absence of any attritious wear) that occurred over the consecutive cuts from the first cut in a series or the cut immediately following a fracture cut (hereafter designated "first cut") to the first or next fracture cut or the last cut in the series (hereafter designated "last cut"), respectively. In each case, the calculated depth of the "first cut" is subtracted from the calculated depth of the "last cut" to obtain the change in depth with attritious wear assumed to be at a linear rate therebetween. Then the difference between the distances of the "first cut" and the "last cut" from the forward plate end is determined, which is the distance between the "first cut" and "last cut". The latter difference is multiplied by the factor of 110 cuts ÷ 6 inches to obtain the number of cuts from the "first cut" to the "last cut". The latter product is divided into the preceding change in depth value to yield the desired rate of cut depth increase per cut. Next, the total number of possible successful cuts with calculated depths in the range of 2.616 to 3.924 × $10^{-3}$ inch which precede and include every "last cut" is determined in four groups of computations. In the first group, for each "last cut" with a calculated depth of 0.003924 inch or greater, the related computed rate of cut depth increase per cut is divided into 0.000436 inch and the resultant dividend is multiplied by 3. In the second group, for each "last cut" with a calculated depth less than 0.003924 inch but at least equal to 0.003488 inch, the related rate of cut depth increase per cut is divided into 0.000436 inch and the resultant dividend is multiplied by 2. Then the difference (if any) between the "last cut" calculated depth and 0.003488 inch is divided by the related rate of cut depth increase per cut. In the third group, for each "last cut" with a calculated depth less than 0.003488 inch but at least equal to 0.003052 inch, the related rate of cut depth increase per cut is divided into 0.000436 inch. Then the difference (if any) between the "last cut" calculated depth and 0.003052 inch is divided by the related rate of cut depth increase per cut. In the fourth group, for each "last cut" with a calculated depth less than 0.003052 but at least equal to 0.002616 inch, the difference (if any) between the "last cut" calculated depth and 0.002616 inch is divided by the related rate of cut depth increase per cut. The total sum of all calculated values from the preceding four groups of computations covering all five series of cuts on all 10 test plates is the desired total number of possible successful cuts. Upon dividing this latter sum into the previously stored total number of fracture cuts, the resultant dividend is then multiplied by 100 to yield the percentage value of probability of fracture of a sample.

The attritious wear rate takes into account only wear debris smaller than 1 micron (i.e. excludes chipping, which is larger size pieces that break off the grain specimen). This rate is computed only for the one selected series of cuts as previously noted. Utilizing the measurements of the first cut of the series and the cut nearest 1 inch from the forward plate end, the computer determines a linear attritious wear rate (assumed to be linear) between those two cuts. Assuming the same linear rate prior to the first cut, the computer then determines the location of "zero cut depth" on the top surface of the plate (or on an imaginary extension thereof beyond the forward plate end if such is necessary due to inaccuracy in the initial positioning of the plate vis a vis the wheel). Such location of "zero cut depth" is a point just prior to the first point where the tip of the rotating grain specimen would almost imperceptibly cut the plate surface (or its imaginary extension) as it very slowly moves laterally under the wheel.

Next, the computer determines the calculated depth of the theoretical ninety second cut at a location on the top surface of plate 5 inches from the "zero cut depth" point in the direction toward the rear plate end. To do this, the computer selects measurements of the actual cuts that immediately precede and follow such location of the theoretical 90 second cut. From those measurements, a linear attritious wear rate (assumed to be linear) is computed between those two cuts. From such combined data, the proportionally calculated value of depth of the theoretical ninety second cut is obtained. In the event that chipping has occurred in the selected series, then the computer determines from the other measurements of cuts before and after each fracture cut the total amount of cut depth lost by such chipping and adds that amount to the above-described calculated value of depth of the theoretical 90 second cut to provide a value of such depth compensated for chipping so as to be the value which would have been obtained in the absence of chipping. The depth of the theoretical ninety second cut is likewise calculated for a selected series of cuts on each of the other nine test plates cut by specimens of the same sample. These 10 resultant cut depth values are added together and divided by 10 to obtain the arithmetic mean of the calculated values of depth of the theoretical 90 second cuts for specimens of a given sample. Such arithmetic mean is then subtracted from the theoretical depth of cut for the theoretical 9 second cut, which theoretical depth of cut is that depth which would have occurred if no wear occurred on the grain specimens. The resultant difference is the mean value of total calculated wear of the grain specimens after having made 92 cuts (real plus imaginary). The attritious wear rate in inch per cut is then computed by dividing that mean value of total calculated wear by 92.

Table 4 shows the values of probability of fracture ($P_c$), attritious wear rate ($\Delta t_a$) and average or typical Knoop hardness (with 100 g. load) for the 10 samples of this invention tested on plates of A.I.S.I. 1018 steel with a nominal Rockwell hardness of Rockwell $R_c 33$.

Table 5 shows the comparative values of probability of fracture ($P_c$) and attritious wear rate ($\Delta t_a$) for five samples of commercial abrasive grains tested in the manner described above on plates of A.I.S.I. 1018 steel with a nominal Rockwell hardness of Rockwell $R_c 33$. Sample W is fused grain of about 40 wt.% $ZrO_2$ and 60 wt.% $Al_2O_3$. Samples V, X and Y are fused grain of about 25 wt.% $ZrO_2$ and 75 wt.% $Al_2O_3$. Sample Z is a sintered alumina grain. The specimens of all but sample V were standard No. 10 grit size. Sample V was of a nonstandard size between No. 8 and No. 10 grit.

Table 6 shows comparative values of probability of fracture and attritious wear rate for Sample H of this invention immersed for eight hours and for samples of three of the previously noted commercial abrasive grains, all of the grit sizes being as noted above and all tested on plates of A.I.S.I. 304 stainless steel in the manner described above. These plates had nominal Rockwell hardness of $R_B 73$.

TABLE 4

| Sample | Immersion Time - 16 hours | | | Immersion Time - 24 hours | | |
|---|---|---|---|---|---|---|
| | $P_c$ % | $\Delta t_a$ in/cut×$10^{-6}$ | $KHN_{100}$ | $P_c$ % | $\Delta t_a$ in/cut×$10^{-6}$ | $KHN_{100}$ |
| A | 0.17 | 4.89 | 895 | 0.15 | 3.04 | 883 |
| B | 0 | 2.83 | 898 | 0.11 | 2.61 | 939 |
| C | 0.07 | 3.48 | 1058 | 0.07 | 1.74 | 1042 |
| D | 0 | 3.70 | 962 | 0 | 4.02 | 1052 |
| E | 0.16 | 2.83 | 1092 | 0.09 | 3.91 | 1145 |
| F | 1.00 | 5.44 | 956 | 0.23 | 1.63 | 976 |
| G | 0.19 | 1.41 | 1030 | 0.16 | 0.65 | 1102 |
| H | 0 | 2.39 | 1065 | 0.36 | 2.50 | 1036 |
| I | 0 | 0.87 | 1197 | 0 | 1.30 | 1132 |
| J | 0 | 1.63 | 1169 | 0.17 | 2.06 | 1143 |
| K | — | — | — | 0.38 | 1.96 | 1100 |
| L | 0.24 | 3.26 | 972 | 0.32 | 2.07 | 1005 |
| M | 0.23 | 2.06 | 895 | 0.24 | 0.54 | 970 |
| N | 0.17 | 4.67 | 986 | 0.14 | 0.87 | 966 |
| O | 0* | 3.27 | 1058 | 0 | 1.74 | 1092 |
| P | 0.44 | 2.83 | 1046 | 0 | 0.87 | 1137 |
| Q | 0.08 | 3.15 | — | 0.15 | 3.26 | 1215 |
| R | — | — | — | 0.08 | 3.80 | 1163 |

*Based on nine specimens because the tenth specimen was flawed and could not be properly tested.

TABLE 5

| Sample | $P_c$ % | $\Delta t_a$ in/cut×$10^{-6}$ |
|---|---|---|
| V | 0.49 | 7.29 |
| W | 1.00 | 9.46 |
| X | 0.76 | 6.96 |
| Y | 0.59 | 8.05 |
| Z | 2.74 | 12.5 |

TABLE 6

| Sample | $P_c$ % | $\Delta t_a$ in/cut×$10^{-6}$ |
|---|---|---|
| H | 0.60 | 4.16 |
| V | 1.59 | 5.83 |
| W | 1.36 | 4.75 |
| Z | 0.90 | 10.21 |

Preliminary comparative tests with two grinding wheels of resin-bonded grains — one with grains corresponding to sample V — in conditioning a cast plate of stainless steel showed that the sample H grains produce a smoother surface without discoloration and exhibit faster metal removal rate at lower wheel head load (i.e. lower horsepower consumption) via a vis the sample V grains.

Example 2

An illustrative grinding wheel for snagging can be made from the following mixture (in volume percent):

Abrasive grain of Sample G-
   No. 8 grit size ............... 18.7

-continued

| | |
|---|---|
| No. 10 grit size | 18.7 |
| No. 12 grit size | 18.7 |
| Phenol-formaldehyde resin | 25.0 |
| Cryolite | 6.7 |
| Iron pyrite | 8.5 |
| Lime | 1.0 |
| Furfural | 2.7 |

The grain is wet with the furfural and then thoroughly mixed with the other ingredients. This mixture is then hot pressed in a mold at 177°C. for about 15 minutes to 1 hour under pressure of about 2000 psi. Next, the molded piece is removed from the mold while hot and immediately placed in an oven to cure at about 177°C. for 24 hours.

Example 3

An illustrative coated abrasive product can be made by applying to a suitably prepared drills cloth backing a thin coating of sizing adhesive consisting of (by wt.) about 25 parts of 86 millipoise hide glue, about 25 parts of finely divided $CaCO_3$ and about 49 parts of water to give a coating thickness, in dried sizing adhesive weight, of about 2 pounds per coated ream. Then a making coat consisting of (by wt.) about 30 parts of the same hide glue, about 30 parts of the $CaCO_3$ and about 39 parts of water (all mixed and brought to a temperature of about 21°C.) is applied and No. 24 grit size abrasive grain of Sample M (immersed 24 hours) is applied to the wet making coat in an amount equivalent to about 45 pounds per coated ream. This combination is then dried. A final sizing coat (in parts by wt.) of 32 parts of phenol-formaldehyde resin, 54 parts of $CaCO_3$ and 14 parts of water (all mixed and at about 38°C.) is applied and then cured to set the phenolic resin.

Example 4

By way of illustrating other articles that can be made of the new cermet, hot glass of Sample A at about 1350°C. can be drawn by conventional means into tubing 2 inches in outside diameter with a wall thickness of about 0.125 inch. The hot tubing at a temperature of not less than 750°C. is immersed for about 1 hour in molten aluminum at 750°C. Incidentally, other thicknesses may be accomodated by varying immersion time since a typical reaction rate is about 0.12 mm./hour, but it may vary somewhat with glass composition — particularly decreasing as the $B_2O_3$ content increases. Upon removing the cermet tubing from the molten aluminum bath, the excess aluminum is leached off the surfaces of the tubing to provide the final product.

Example 5

As an alternative procedure to Example 1, the formed (unreacted) glass ribbon segments can be flexed to liberate the substantially octahedral portions thereof as loose glass grains. These glass grains can then be reacted, leached and washed in the same manner as set forth in Example 1.

Example 6

As a less desirable option to Example 1, grains may be formed without use of the forming rolls by conventionally crushing a mass of the cooled glass either before or after it has been converted to a reaction cermet by immersion in molten aluminum-base metal. Thus, glass of composition corresponding to sample H was initially formed as cooled patties or slabs of approximately ½ × 6 × 6 inch dimensions. In one case, a patty was crushed and sieved (U.S. Standard) to yield glass grains of −8 + 10 mesh, which were immersed in molten aluminum at 750°C. for 15⅔ hours and then followed by caustic solution cleaning of the resultant cermet grains (designated H-1). In another case, a patty was immersed in molten aluminum at 750°C. for 65⅓ hours and then followed by caustic solution cleaning of the resultant cermet patty, which was subsequently crushed and sieved (U.S. Standard) to yield cermet grains (designated H-2) of −8 + 10 mesh. Twenty-five specimens of each type of the crushed grains were subjected to the plain fly milling test on A.I.S.I. 1018 steel plates as described in Example 1 and the results are set forth in Table 7.

TABLE 7

| Grains | $P_c$ % | $\Delta t_a$ in/cut×$10^{-6}$ |
|---|---|---|
| H-1 | 0.96 | 4.70 |
| H-2 | 0.83 | 3.37 |

In addition to abrasives, the new cermet can be advantageously used in forming refractory articles (including heat exchange media), wear resistant articles or other desired end products.

I claim:

1. A dense, coherent, substantially homogeneous cermet composition of matter composed essentially of, on a weight basis, at least 60% magnesium aluminate spinel crystals, 0 to 10% alpha alumina crystals, 0 to 2% mullite crystals, 0 to 5% magnesium aluminum boride crystals and 10 to 30% aluminum-base metal phase.

2. The cermet composition of matter of claim 1 in which at least 90% by volume of the crystals of spinel, alumina and mullite are of a size less than 1 micron with their average size being not more than 0.5 micron, and the metal phase is finely interspersed throughout the mass of said crystals.

3. The cermet composition of matter of claim 1 which analytically comprises, on a weight basis, 2.5 to 33% MgO, 39 to 76% $Al_2O_3$, 0 to 22% $B_2O_3$ and the balance being essentially aluminum-base metal.

4. The cermet composition of matter of claim 1 wherein the metal phase does not exceed 26% by weight and which analytically comprises, on a weight basis, 4.5 to 23% MgO, 49 to 74% $Al_2O_3$, 0 to 13% $B_2O_3$ and the balance being essentially aluminum-base metal.

5. The cermet composition of matter of claim 4 composed wholly of, on a weight basis, at least 75% magnesium aluminate spinel crystals, 0 to 2% magnesium aluminum boride crystals and 10 to 26% aluminum-base metal phase.

6. The cermet composition of matter of claim 5 wherein the analytical $B_2O_3$ content is 3 to 10% by weight thereof.

7. Abrasive grain composed of the cermet composition of matter of claim 2 in the form of particles.

8. Abrasive grain composed of the cermet composition of matter of claim 6 in the form of particles.

9. An abrasive article comprising a coacting combination of abrasive grain of claim 7 and abrasive grain bonding material.

10. An abrasive article comprising abrasive grain of claim 8 bonded together with abrasive grain bonding material.

11. A grinding wheel comprising a coacting combination of abrasive grain of claim 7 and abrasive grain bonding material.

12. A grinding wheel comprising abrasive grain of claim 8 bonded together with abrasive grain bonding material comprising organic resin bonding agent and filler material.

13. A coated abrasive article comprising a coacting combination of a flexible backing for coated abrasive grain and abrasive grain of claim 7 attached thereto by an abrasive grain adhesive.

* * * * *

UNITED STATES PATENT OFFICE
CERTIFICATE OF CORRECTION

PATENT NO. : 3,940,276
DATED : February 24, 1976
INVENTOR(S) : Lois E. Wilson

It is certified that error appears in the above-identified patent and that said Letters Patent are hereby corrected as shown below:

Column 2, line 40, insert -- alumina -- before grains.

Column 9, line 5, change "pllate" to -- plate -- .

Column 11, line 50, change "9" to -- 90 -- .

Signed and Sealed this

*twenty-second* Day of *June 1976*

[SEAL]

Attest:

RUTH C. MASON
*Attesting Officer*

C. MARSHALL DANN
*Commissioner of Patents and Trademarks*